Patented Aug. 22, 1944

2,356,302

UNITED STATES PATENT OFFICE 2,356,302

DRILLING FLUID

Thomas S. Chapman, Houston, Tex., assignor to Standard Oil Development Company, a corporation of Delaware No Drawing. Application July 11, 1941, Serial No. 401,961

16 Claims. (Cl. 252—8.5)

This invention relates to improvements in drilling fluids used in producing bore holes.

In the art of drilling wells for oil or gas by the rotary method a fluid usually comprising solid suspended in liquid is pumped down the drill pipe to the drill bit. The drilling fluid carries to the surface of the earth particles cut by the bit and serves as a lubricant to cool the bit, and as a sealing agent to plaster the walls of the hole and seal off porous formations.

An object of the present invention is to provide a drilling fluid having improved wall forming characteristics.

More specifically, it is an object of the present invention to incorporate thermo-setting materials in the drilling fluid whereby the material forming the wall of the borehole sets up into a hard drillable impervious wall.

In accordance with the present invention a liquid base, usually either water or oil, has incorporated therein thermo-setting resins or mixtures of ingredients which will react to produce such resins when subjected to the heat of underground formations. These thermo-setting materials are usually heavier than the liquid base in which they are suspended or emulsified so that the mixture is of greater density than the oil base. In general, however, such mixtures do not have sufficient density, but weighting materials common to the art, such as barytes, colloidal clay, iron oxide, and the like, may be added to the mixture as required to produce the desired density.

It is well known to the art that in drilling holes the temperatures encountered usually progressively increase with the depth of the hole. In the deep wells often produced at the present time it is not unusual to encounter temperatures of 200° F. or even higher in the lower portion of the bore hole. It is accordingly preferable to regulate the speed at which the thermo-setting materials solidify by incorporating them in the liquid base to form the drilling mud so that they will set up in the desired time interval in accordance with the temperature of the formation being penetrated by the drill bit.

A number of thermo-setting materials are well known which are suitable for admixture with a liquid base to form a drilling fluid. The most common and widely known materials which have been found to be useful in producing such mixtures are phenol formaldehyde, urea formaldehyde and phenolic furfural. These materials may be treated to produce a range of setting times so that substantially any desired speed of setting may be obtained when using these materials. These thermo-setting materials may be mixed with either an oil base or water base and suitable weighting materials may also be added thereto to give the mixture the desired density. Other thermo-setting materials known to the art may be used, but the types listed above have been found to give the most satisfactory results and are almost universally obtainable.

As stated above, the setting time of the thermo-setting material may be varied, if desired, but I have found a thermosetting time of four hours at the temperature of the formation being penetrated by the drill bit to be generally preferable. Even in relatively deep holes in which the total round trip for the drilling fluid may be an hour or more, the time required for pumping the fluid down the drill stem is relatively small, being in the neighborhood of ten minutes. It will accordingly be evident in the use of thermo-setting materials having a setting time of four hours that a margin of safety is available so that in case of accident a substantial period of time will be available in which to displace the thermo-setting materials from the drill hole before they solidify within the drill pipe and the annular space between the borehole and the drill stem.

The filter cake formed on the wall of the borehole by the drilling fluids of the present invention will be principally thermo-setting resins if no additional weighting materials are added or, if weighting materials are used it will be comprised of these weighting materials and the thermo-setting resins. The rotation of the drill stem on the plastic resins will cause them thoroughly to permeate the mass of the filter cake so that generally speaking the resultant sheath will be weighting materials or mud particles incorporated in the resins and acting as a filler in the mass. After the thermo-setting resins have hardened, the borehole will, in effect, be lined with a continuous conduit formed of the hardened resins.

The drilling equipment employed when using drilling fluids comprising thermo-setting materials in accordance with the present invention may be that conventionally used in producing boreholes. It will be advisable progressively to add fresh thermo-setting materials to the mud stream as it is circulated with continuously positive removal of particles which have hardened but have not become incorporated in the mud sheath of the hole. These hardened particles are advantageously removed by passing the mud stream or a portion thereof through a shale shaker as it is circulated to the surface preparatory to returning it to the borehole.

If a producing formation is penetrated while employing the drilling fluid of the present invention and it is desired to produce from this formation, the borehole sheath comprised of the thermo-setting material may be perforated in the same manner as steel casing is customarily perforated at the present time, or in the alternative removed by drilling as are the drillable metallic casings now sometimes used.

Having fully described the present invention, what I desire to claim is:

1. A drilling fluid comprising a mixture of a thermo-setting resin with water.

2. A drilling fluid comprising a suspension of a thermo-setting resin in oil.

3. A drilling fluid comprising a suspension of organic material, having the characteristic of setting into a hard resin in a relatively short time under the influence of heat, and water in a normally liquid base.

4. A drilling fluid comprising a suspension of a material, which will form a resin in a relatively short time under the influence of temperatures encountered in subterranean formations, water and solid weighting material.

5. A drilling fluid comprising a suspension of a material, which will form a resin in a relatively short time under the influence of temperatures encountered in subterranean formations, oil and solid weighting material.

6. A drilling fluid in accordance with claim 3 in which the material sets to form a phenol formaldehyde resin.

7. A drilling fluid in accordance with claim 3 in which the organic material forms a urea formaldehyde resin under the influence of temperatures encountered in drilling bore holes.

8. A drilling fluid in accordance with claim 3 in which the organic material forms a phenolic furfural resin under the influence of temperatures encountered in drilling boreholes.

9. In the method of drilling wells the step of circulating in the drill hole during the general drilling operation a drilling fluid comprising a material having thermosetting characteristics dispersed in a normally liquid base, said material forming a resin under borehole conditions.

10. A method in accordance with claim 9 in which a material which sets under bore hole conditions to form a phenol formaldehyde resin is employed as the thermosetting material.

11. A method in accordance with claim 9 in which a material which sets under bore hole conditions to form a urea formaldehyde resin is employed as the thermosetting material.

12. A method in accordance with claim 9 in which a material which sets under bore hole conditions to form a phenolic furfural resin is employed as the thermosetting material.

13. In the method of drilling wells the step which comprises circulating in the drill hole during the general drilling operation a drilling fluid comprising a material having thermosetting characteristics dispersed in a normally liquid base, said material forming a resin under bore hole conditions in no shorter time than four times the period required for a round trip of the drilling fluid.

14. A method in accordance with claim 13 in which a material which sets under bore hole conditions to form a phenol formaldehyde resin is employed as the thermosetting material.

15. A method in accordance with claim 13 in which a material which sets under bore hole conditions to form a urea formaldehyde resin is employed as the thermosetting material.

16. A method in accordance with claim 13 in which a material which sets under bore hole conditions to form a phenolic furfural resin is employed as the thermosetting material.

THOMAS S. CHAPMAN.